United States Patent [19]
Savicki

[11] Patent Number: 5,633,498
[45] Date of Patent: May 27, 1997

[54] THERMODYNAMICALLY OPTIMAL INFRARED COLLECTOR WITH DIRECTIONAL REDUCTION OF CONCENTRATION

[75] Inventor: Joseph P. Savicki, Clinton, N.J.

[73] Assignee: Lucent Technologies Inc., Murray Hill, N.J.

[21] Appl. No.: 306,846

[22] Filed: Sep. 14, 1994

Related U.S. Application Data

[63] Continuation-in-part of Ser. No. 37,860, Mar. 29, 1993, Pat. No. 5,359,189.

[51] Int. Cl.$^6$ .................................................. G01J 5/08
[52] U.S. Cl. .................................................. 250/353
[58] Field of Search ....................................... 250/353

[56] References Cited

U.S. PATENT DOCUMENTS

| | | | |
|---|---|---|---|
| 3,059,113 | 10/1962 | McHenry | 250/353 |
| 4,024,397 | 5/1977 | Weiner | 250/338.1 |
| 4,425,504 | 1/1984 | Turnbull et al. | 250/353 |
| 4,787,082 | 11/1988 | Delaney et al. | 370/85 |
| 5,239,179 | 8/1993 | Baker | 250/338.4 |
| 5,359,189 | 10/1994 | Savicki | 250/216 |

OTHER PUBLICATIONS

F. R. Gfeller and U. Bapst, "Wireless In-House Data Communication via Diffuse Infrared Radiation", Proceedings of the IEEE, vol. 67, No. 11, Nov. 1979 pp. 1474-1486.

G. Smestad, H. Ries, R. Winston, E. Yablonovitch, "The Thermodynamic Limits of Light Concentrators", Solar Energy Materials, vol. 21, 1990, 99–111.

M. E. Marhic, M. D. Kotzin, and A. P. van den Heuvel, "Reflectors and Immersion Lenses for Detectors of Diffuse Radiation", J. Opt. Soc. Am., vol. 72, Nov. 3, Mar. 1982 pp. 352–355.

J. M. Kahn, J. R. Barry, W. J. Krause, M. D. Audeh, J. B. Carruthers, G. W. Marsh, E. A. Lee, and D. G. Messerschmitt, "High-Speed Non-Directional Infrared Communication for Wireless Local-Area Networks", IEEE, 1992 pp. 83–87.

R. Clark Jones, "Immersed Radiation Detectors", Applied Optics, vol. 1, No. 5, Sep. 1962 pp. 607–613.

*Primary Examiner*—Constantine Hannaher

[57] ABSTRACT

An infrared collector for use in communications systems. The infrared collector employs a concentrator which concentrates infrared radiation received from some directions more than others. The concentrator is made of a dielectric material which is substantially transparent to infrared radiation and has a shape which is convex above a base plane determined by the top surface of an infrared radiation detector and in which any ray which connects any part of the top surface of the detector to any part of the concentrator above the base plane intersects the surface of the concentrator at an angle less than the critical angle for the material from which concentrator is made. The amount of concentration from a given direction is controlled by the curvature of the collector. The less a portion of the surface is curved, the less infrared radiation normal to the less-curved portion is concentrated. The collector may be used in environments where there is a predominant direction from which infrared noise is received in the collector which is different from the direction from which infrared communications signals are received in the collector.

8 Claims, 2 Drawing Sheets

THERMODYNAMICALLY OPTIMAL INFRARED COLLECTOR WITH DIRECTIONAL REDUCTION OF CONCENTRATION

CROSS REFERENCE TO RELATED APPLICATION

This application is a continuation-in-part of U.S. Pat. No. 5,359,189 to Joseph P. Savicki U.S. Ser No. 08/037,860, Joseph P. Savicki, *Infrared Collector*, filed Mar. 29, 1993.

BACKGROUND OF THE INVENTION

The invention relates generally to light concentrators and more particularly to collectors for infrared radiation.

DESCRIPTION OF THE PRIOR ART

As digital systems have grown smaller, portability has become an evermore important consideration in their design. An important component of portability is wireless connectivity, that is, the capability of digital devices to communicate with each other without being connected by cables. Infrared radiation has long been used to achieve wireless connectivity; an example is the remote controls used with consumer electronics devices. Such remote controls work by sending infrared signals from the remote control to a receiver on the electronics device.

There have, however, been important limits on the use of infrared radiation for wireless connectivity. There have in general been two classes of devices which have used infrared radiation for wireless connectivity: directed devices such as the remote control mentioned above which must be pointed at the infrared receiver and non-directed devices, which don't have to be aimed. Prior-art non-directed devices have worked simply by outputting an infrared signal so powerful that it is powerful enough to be usable anywhere within an enclosed space containing the non-directed device.

Each of these classes of devices has its disadvantages. The directed devices are low powered, but they must be pointed. If the directed device is mobile, it must be constantly re-aimed. The non-directed devices do not need to be re-aimed, but the power required to produce their infrared signals has made it difficult to produce low-powered and therefore light-weight portable devices.

The parent of the present application disclosed a thermodynamically-optimal infrared collector which could concentrate infrared radiation but was relatively insensitive to the direction from which the radiation came. A problem in the environment in which the infrared collector disclosed in the parent operated was the infrared noise produced by ceiling-mounted lighting fixtures. As disclosed in the parent, the infrared collector could be modified to concentrate relatively less of the noise than it did of the infrared signals by flattening the top of the collector. Infrared radiation entering the collector via the flattened top was concentrated less than infrared radiation entering the collector elsewhere, and consequently, the noise was concentrated less than the desired signals.

Further work with the infrared collector of the parent has led to the discovery of the general principles underlying the infrared collector with the flattened top and to the development of techniques for making thermodynamically-optimal infrared collectors which provide diminished concentration of light received from certain directions. These techniques are the subject of the present patent application.

SUMMARY OF THE INVENTION

The infrared collector of the invention has two components: an infrared detector for detecting infrared radiation and a concentrator for concentrating infrared radiation on the collector. The concentrator is made of a dielectric material which transmits infrared radiation and has a convex surface which is substantially transparent to infrared radiation. The convex surface is such that any line which connects any part of the infrared detection means to the surface intersects the surface at an angle less than the critical angle for the material. The concentrator is able to concentrate infrared radiation from a certain direction less than from other directions because the surface of the concentrator which receives the light from the certain direction is flatter than the surface of the remainder of the concentrator. In a preferred embodiment, the concentrator is an oblate ellipsoid.

The foregoing and other objects and advantages of the invention will be apparent to one of ordinary skill in the art who peruses the following Drawing and Detailed Description, wherein:

Figure 1:
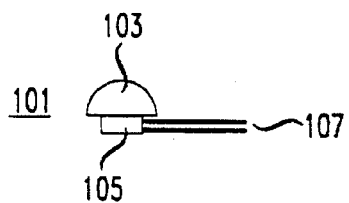
FIG. 1 is a diagram of a preferred embodiment of the collector of the invention.

The reference numbers employed in the Drawing and the Detailed Description have three or more digits. The two least significant digits are a number within a figure; the remaining digits are the figure number. Thus, the element with the reference number "105" is first shown in FIG. 1.

DETAILED DESCRIPTION

The following Detailed Description contains the entire Detailed Description of the parent and additional new material following the detailed Description of the parent. The Detailed Description of the parent first describes a preferred embodiment of the infrared collector and then provides a theoretical demonstration of the reasons for its improved performance. Thereupon, the new material discloses how one of the embodiments disclosed in the parent may be generalized.

The Infrared Collector: FIG. 1

FIG. 1 shows a preferred embodiment of the infrared collector. Infrared collector 101 includes an infrared radiation detector 105 and a dielectric hemisphere 103. Signals detected by the collector are provided via connection 107 to the device to which the collector is attached. In the preferred embodiment, infrared radiation detector 105 consists of an array of four plastic-encased PIN diodes which have been glued together and connected in parallel. In other embodiments, other forms of infrared radiation detectors may be used, including for example, a single diode. The coupling between the detector and the hemisphere must be such that a minimal amount of light is reflected from the coupling. In a preferred embodiment, hemisphere 103 is made of transparent plastic and the diode array is glued to the flat surface. Hemisphere 103, the glue, and the plastic encasing the PIN diodes all have substantially the same optical index of refraction. In other embodiments, hemisphere 103 may be integral with the packaging of the diodes. In such an embodiment, materials with an index of refraction substantially higher than that of plastic may be employed and the concentrating effect of the hemisphere thereby increased.

In a preferred embodiment, the hemisphere may have any radius which is greater than or equal to a value determined as follows: the index of refraction of the plastic making up the hemisphere is N; the distance d is the distance from the center of the array of diodes to the most remote part of the infrared-sensitive material; the minimum radius of the hemisphere is then dN. The fact that only a minimum radius of the hemisphere is determined by the size of the infrared detector simplifies fabrication of the collector and further permits the size of the hemisphere to be altered to diminish the loss of light due to reflection.

The degree of concentration provided by the hemisphere is substantially independent of its radius and approaches $N^2$; thus, in the preferred embodiment, where the plastic used in the hemisphere has an index of refraction of substantially $\sqrt{2}$, the degree of concentration is 2.

Hemisphere 103 may further be replaced by any transparent dielectric solid such that: that:

the solid is convex above a base plane determined by the top surface of the detector; and any ray which connects any part of the top surface of the sensor to any part of the solid above the base plane intersects the surface of the solid at an an angle less than the critical angle for the material.

Figure 4:
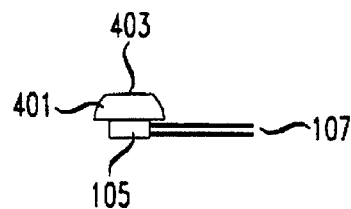
FIG. 4 is a diagram of an embodiment of the collector which has been modified to selectively concentrate infrared radiation.

Moreover, the convex shape may be formed such that signals from certain areas of the half space are concentrated more than signals from other areas of the half space. For example, the concentrator for a collector used in an indoor environment may be modified such that it preferentially concentrates light from areas other than directly above the concentrator, and may thus act to diminish the response of detector 105 to light from the interior lighting. One such modification is to simply flatten the top of hemisphere 103. FIG. 4 shows such a modified hemisphere 401. Vertical light which strikes flat surface 403 will not be concentrated by modified hemisphere 401, while other light striking modified hemisphere 401 will be. Consequently, the response of detector 105 to light from the interior lighting will be substantially diminished.

A special characteristic of hemisphere 103 is that it is a non-directive concentrator; consequently, the infrared radiation which it concentrates may come from any point in the half-space above the hemisphere. That being the case, collectors using hemisphere 103 are effective with both systems using line-of-sight communications and systems using diffuse communications. Collectors based on the same principles as collector 101 may be constructed using any kind of non-directive concentrator; a hemispheric non-directive concentrator is however particularly advantageous because it is easily made and couples well to flat diodes. Another type of non-directive concentrator which can be easily coupled to flat surfaces is the dielectric-filled compound parabolic concentrator. For a discussion of non-directive concentrators generally, see Smestad, G., et al., "The Thermodynamic Limits of Light Concentrators," *Sol. Energy Mater.*, vol. 21, no. 2–3, pp. 99–111, 1990.

Theory of the Concentrator

Hemisphere 103 (or any other shape meeting the conditions described above) operates to concentrate line of sight signals because detector 105 is at the center of the base plane and the convex shape above the base plane diverts all rays from the transmitter in a direction such that they strike the base plane closer to its center than they would if they had not passed through the solid. In the case where the hemisphere is much larger than the sensor and the signal source is very far away, the concentration approaches $N^2$.

Figure 2:
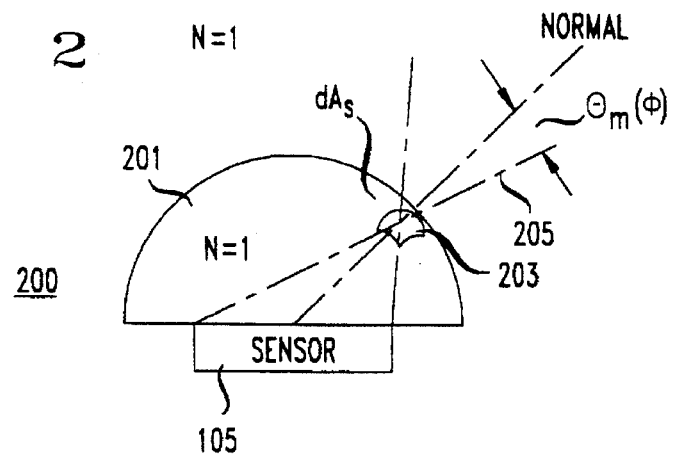
FIG. 2 is a diagram of an ideal hemisphere which does not bend the light passing into it.
Figure 3:
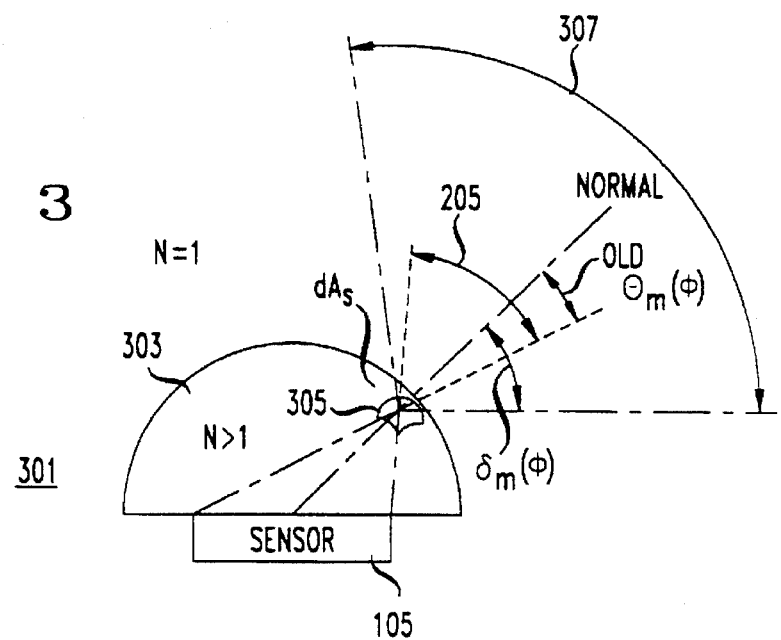
FIG. 3 is a diagram of a hemisphere which does bend the light passing into it.

How hemisphere 103 and its analogues operate to concentrate diffuse signals can be understood from FIGS. 2 and 3. FIG. 2 shows a system 200 in which hemisphere 201 has the same refractive index as the medium through which the signals are moving. At the surface of hemisphere 201 is surface element 203. Lines from the boundaries of sensor 105 which follow the paths of rays of light as they pass through surface element 203 define a shape 205. Any light ray which strikes the surface element and is within shape 205 will reach sensor 105. FIG. 3 shows a system 301 in which hemisphere 303 has a refractive index which is higher than that of the medium through which the signals are moving. When lines are drawn as before, they follow paths determined by the refractive index of the material making up hemisphere 303 to make shape 307. The dotted lines show shape 205. As is apparent from FIG. 3, shape 307 completely contains shape 205, and the concentration of light by hemisphere 303 is a function of the difference in size between shape 205 and shape 307.

The fact that the concentration in the case of diffuse signals is $N^2$ can be derived mathematically as follows: Referring again to FIG. 2, $\theta_m(\phi)$ represents the generalized field of view of an infinitesimal surface element $dA_s(203)$ on hemisphere 201 which couples external radiation to sensor 105. The incremental power passing through infinitesimal surface element 203 which also strikes sensor 105 is $$dP_s = \int_0^{2\pi} d\phi \int_0^{\theta_m(\phi)} d\theta \sin(\theta) \left[ \frac{w}{\pi} \cos(\theta) \right] dA_s. \tag{1}$$

where w is a constant representing the intensity of the diffuse radiation. The evaluation of this integral, in general, is very complex and will not be attempted here.

Continuing with FIG. 3, if hemisphere 201 is replaced with hemisphere 303 of index N, refraction at the hemisphere surface changes the generalized field of view from $\theta_m(\phi)$ to $\delta_m(\phi)$. The new incremental power, $dP_s^c$, coupled to the sensor by this concentrator through hemispherical surface element $dA_s$ (305) is $$dP_s^c = \int_0^{2\pi} d\phi \int_0^{\delta_m(\phi)} d\delta \sin(\delta) \left[ \frac{w}{\pi} \cos(\delta) \right] dA_s. \tag{2}$$

where $\delta_m(\phi)$ is related to the $\delta_m(\phi)$ of equation 1 through Snell's Law of refraction. Thus, $$\sin [\delta_m(\phi)] = N \sin[\theta_m(\phi)] \tag{3}$$

so long as $\theta m(\phi)$ is below the critical angle for total internal reflection in a material of index N.

Under this critical angle constraint, a variable transformation from $\delta$ to a new variable $\psi$ according to $$\sin (\delta) = N \sin(\psi), \; (d\delta \cos(\delta) = N d\psi \cos(\psi)) \tag{4}$$

is allowed. The old limit of integration, $\delta_m(\phi)$, changes to $\psi_m(\phi)$, where $\psi_m(\phi)$ is identically equal to the $\theta_m(\phi)$ of Equation 1. Thus, the incremental power coupled to the sensor becomes $$dP_s^c = N^2 \int_0^{2\pi} d\phi \int_0^{\theta_m(\phi)} d\psi \sin(\psi) \left[ \frac{w}{\pi} \cos(\psi) \right] dA_s \quad (5)$$

and all reference to $\psi$ will vanish if the integration is performed. Comparison of Equation 5 with Equation 1 yields $$dP_s^c = N^2 dP_s \quad (6)$$

for all elements $dA_s$ on hemisphere 303. This indicates that the hemisphere will function as an $N^2$ concentrator for diffuse radiation so long as the critical angle constraint is met.

Figure 5B:
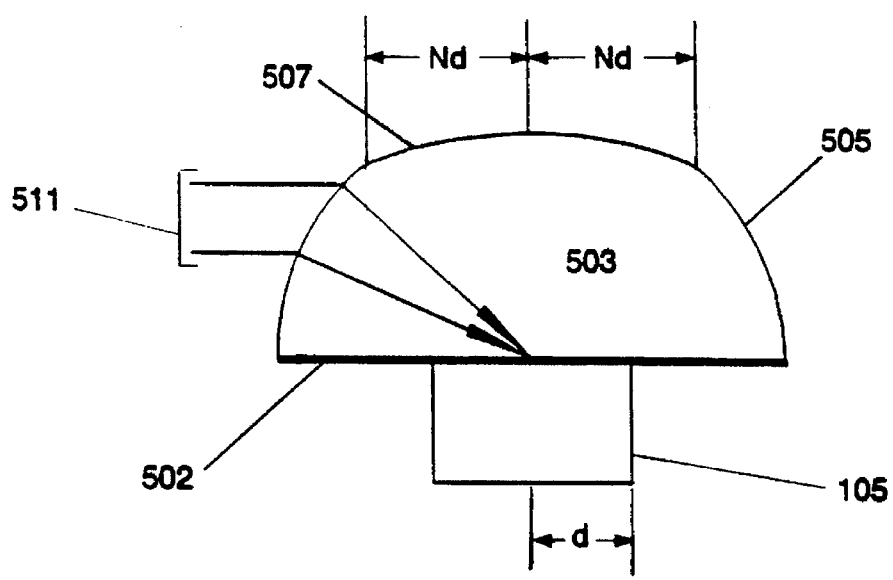
FIG. 5B is a side elevational view of the collector of the invention.
Figure 5A:
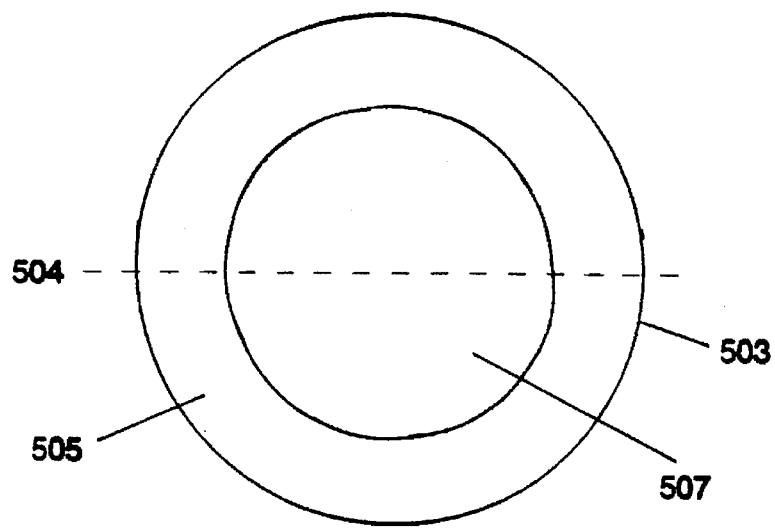
FIG. 5A is a top plan view of the collector of the invention.

Generalization of the Embodiment of FIG. 4: and FIGS. 5A and 5B

FIGS. 5A and 5B show an infrared collector 501 which generalizes the principles of the collector of FIG. 4. FIG. 5B provides a partial cutaway view (along line 504) of the collector shown in FIG. 5A. In FIG. 5B, collector 501 has two main components: concentrator 503 and infrared detector 105. Concentrator 503 is constructed according to the general principles of the concentrators discussed in the parent of the present patent application, i.e. it is made of a dielectric material which is substantially transparent to infrared radiation and has a shape defined as follows: concentrator 503 is convex above a base plane 502 determined by the top surface of detector 105 and any ray which connects any part of the top surface of detector 105 to to any part of concentrator 503 above base plane 502 intersects the surface of concentrator 503 at an angle less than the critical angle for the material from which concentrator 503 is made.

In the collector of FIG. 4, concentrator 401 had a flat top surface 403. The purpose of the flat top surface was to reduce the degree by which concentrator 401 concentrated radiation from directly overhead, so that concentrator 401 preferentially concentrated infrared communications signals received from directions other than directly overhead and thus strengthened those signals relative to the noise received from lighting fixtures located in the ceiling. Flat top surface 403 had this effect because light rays which came from a direction normal to flat top surface 403 and struck flat top surface 403 were not bent by flat top surface 401, and consequently were not concentrated on detector 105, while light rays which struck other portions of the surface of concentrator 401 were bent by the curved surface, and were thereby concentrated on detector 105.

Further study of concentrators of the same general type as concentrator 401 has led to a better understanding of the geometry of concentrators which concentrate radiation received from some directions more than they concentrate radiation received from other directions. Concentrator 503 is an example of such a concentrator. Concentrator 503 has a region of greater curvature 505 and a region of lesser curvature 507. Region of lesser curvature 507 occupies a location in concentrator 503 such that the radiation 509 which is to be less concentrated by concentrator 503 comes from a direction which is normal to the region of lesser curvature. As shown in FIG. 5B, radiation 509 is less concentrated because it is bent less by region of lesser curvature 507 than is radiation 511 which does not strike the region of lesser curvature. In FIGS. 5A and 5B, the region of lesser curvature is at the top of concentrator 503, and the direction from which radiation is less concentrated is vertical, but the region of lesser curvature could be placed at another location on the surface of concentrator 503, and would then act to provide less concentration of light from that direction. Moreover, there may be more than one such region of lesser curvature in concentrator 503.

In general, the curvature and extent of the flatter surface determines the range of angles for which the concentration is reduced and the degree to which the concentration is reduced. For a given extent, the greater the curvature, the greater the range of angles for which the concentration is reduced and the less the reduction in concentration. The limit is the flat surface of concentrator 401, which does not concentrate radiation normal to it at all, but simply passes it through concentrator 401. The minimum radius which such a flat surface must have to guarantee that radiation normal to it is not concentrated on detector 105 is $Nd$, where $N$ is the index of refraction of the material from which collector 503 is made and $d$ is the distance from the center of the surface of detector 105 which is attached to base plane 502 to the most distant point of the detecting material in that surface. Of course, the larger the surface area of the rest of concentrator 503 relative to flatter surface 507, the greater the degree of concentration of signals from the other directions. In a preferred embodiment, concentrator 503 is an oblate ellipsoid with the flatter surface of the ellipsoid being located in concentrator 403 so that the radiation which strikes the flatter surface and normal to it is the radiation which is to be less concentrated. As indicated above, the flatness of the flatter surface determines the degree of concentration and the range of angles.

Conclusion

The foregoing Detailed Description has disclosed to those of ordinary skill in the art how an infrared collector including a a thermodynamically-optimal concentrator which concentrates infrared radiation from some directions more than from other directions may be made and used in an infrared communications system. The Detailed Description has disclosed the best mode presently known to the inventor of practicing his invention; however, as is apparent from the Detailed Description, other embodiments employing the principles of the invention are possible. For example, materials other than plastic may be used, and the infrared detector may be integral with the concentrator. Moreover, the oblate ellipsoid and the hemisphere with a plane are only two of the possible forms of the concentrator; for example, the concentrator may be made up of portions of two spheres, one with a larger radius than the other. What is essential to the invention is that the portion of the concentrator which is to receive the radiation which is to be less concentrated have a lesser curvature than the remainder of the concentrator. In addition, the principles of the preferred embodiment are applicable to collectors for radiation in the visible portion of the spectrum. Because the embodiment disclosed herein is only one of many possible embodiments of the techniques with which the invention is concerned, the foregoing Detailed Description is to be understood as being in every respect illustrative and exemplary, but not restrictive. The scope of the invention disclosed herein is therefore not to be determined from the Detailed Description, but rather from the attached claims, which are to be given the broadest interpretation to which they are entitled under the law.

What is claimed is:

1. A collector for receiving infrared communications signals, comprising:

a concentrator for receiving and concentrating signals including infrared communications signals, the concentrator being made of a dielectric material which transmits infrared radiation and having a convex surface of a non-zero curvature which is substantially transparent to infrared radiation; and infrared radiation detection means for receiving the concentrated infrared communications signals from the concentrator, the convex surface being such that any line which connects any part of the infrared radiation detection means to the surface intersects the surface at an angle less than the critical angle for the dielectric material and the convex surface including a more-curved portion and a less-curved portion, the less-curved portion having a non-zero curvature which is less than a non-zero curvature of the more-curved portion of the convex surface, whereby the concentrator concentrates infrared radiation which strikes the more-curved portion at a direction normal to the more-curved portion at a level of approximately $N^2$, where N is the index of refraction of the dielectric material, and concentrates radiation which strikes the less-curved portion from a direction normal to the less-curved portion at a level less than $N^2$.

2. The collector set forth in claim 1 wherein:

the less-curved portion's curvature and extent control the range of angles for which the concentration is reduced and the degree to which it is reduced.

3. The collector set forth in claim 1, wherein:

the infrared radiation detection means defines a base plane of the collector; and the smallest distance in the base plane from the base plane's center to the convex surface is greater than Nd, where N is the index of refraction of the dielectric material, and d is the distance from the center of a surface of the infrared radiation detection means to the most distant point on the surface of the infrared radiation detection means.

4. The collector set forth in claims 1, 2, or 3, wherein:

said concentrator is a truncated oblate ellipsoid having a base plane whereby infrared radiation which is to be less concentrated by said concentrator strikes the less-curved portion from a direction normal thereto.

5. The collector set forth in claims 1, 2, or 3 wherein:

the less-curved portion is a plane.

6. The collector set forth in claim 5, wherein:

the plane is centered on a center line which is normal to the plane and intersects the center of the infrared radiation detection means; and the minimum distance of the plane's edge from the center line is Nd, where N is the index of refraction of the dielectric material, and d is the distance from the center of a surface of the infrared radiation detection means to the most distant point on the surface of the infrared radiation detection means.

7. The collector set forth in claims 1, 2, or 3, wherein:

the infrared radiation detection means is encased in first material which is transparent to infrared radiation; and the material of the concentrator is the first material or other material which has substantially the same index of refraction as the first material.

8. The collector set forth in claim 7, wherein:

the material of the concentrator is integral with the first material.

* * * * *